United States Patent
Zaleski, II et al.

(10) Patent No.: US 7,379,505 B2
(45) Date of Patent: May 27, 2008

(54) METHOD AND APPARATUS FOR PERFORMING TRELLIS CODED MODULATION OF SIGNALS FOR TRANSMISSION ON A TDMA CHANNEL OF A CABLE NETWORK

(75) Inventors: Kenneth G Zaleski, II, Dacula, GA (US); Anders Hebsgaard, Lawrenceville, GA (US)

(73) Assignee: Broadcom Corporation, Irvine, CA (US)

( * ) Notice: Subject to any disclaimer, the term of this patent is extended or adjusted under 35 U.S.C. 154(b) by 786 days.

(21) Appl. No.: 10/365,531

(22) Filed: Feb. 13, 2003

(65) Prior Publication Data

US 2004/0161048 A1    Aug. 19, 2004

(51) Int. Cl.
*H04L 23/02* (2006.01)
(52) U.S. Cl. .................................... 375/265
(58) Field of Classification Search ............... 370/436, 370/347, 431, 441, 442; 375/260, 257, 265; 341/107; 714/792
See application file for complete search history.

(56) References Cited

U.S. PATENT DOCUMENTS

| | | | |
|---|---|---|---|
| 5,233,349 A | * | 8/1993 | Moulsley .................... 341/107 |
| 6,791,995 B1 | * | 9/2004 | Azenkot et al. ............. 370/436 |
| 7,035,338 B2 | * | 4/2006 | Stopler ........................ 375/260 |
| 2002/0126648 A1 | * | 9/2002 | Kuchi et al. ................. 370/347 |
| 2002/0154620 A1 | * | 10/2002 | Azenkot et al. ............. 370/347 |

OTHER PUBLICATIONS

"Radio Frequency Interface Specification SP-RFI-I05-991105", Data-Over-Cable Service Interface Specifications; Interm Specification; Nov. 1999; (p.21, Sec. 4.2.1 (Upstream-Overview), Paragraph 5).*

"Radio Frequency Interface Specification SP-RFIv2.0-I03-021218," Data-Over-Cable Service Interface Specifications, Cable Television Laboratories, Inc., Dec. 18, 2002, pp. i-xxiv and 1-482.

* cited by examiner

*Primary Examiner*—Don N Vo
(74) *Attorney, Agent, or Firm*—Sterne, Kessler, Goldstein & Fox PLLC (57) ABSTRACT

A method and apparatus for performing trellis coded modulation of signals for transmission on a TDMA channel of a cable network, such as a DOCSIS cable network, is provided. In an embodiment, an upstream modulator portion of a cable modem receives burst data, selectively encodes the burst data for trellis coded modulation to generate encoded symbols, and modulates the encoded symbols for selective transmission over a time division multiple access (TDMA) channel or a synchronous code division multiple access (S-CDMA) channel of the cable network.

19 Claims, 10 Drawing Sheets

METHOD AND APPARATUS FOR PERFORMING TRELLIS CODED MODULATION OF SIGNALS FOR TRANSMISSION ON A TDMA CHANNEL OF A CABLE NETWORK

BACKGROUND OF THE INVENTION

1. Field of the Invention

The present invention is generally directed to broadband communication systems. In particular, the present invention is directed to a method and apparatus for transmitting information over the physical layer of a broadband communication system, such as a cable modem system.

2. Background

In conventional cable modem systems, a coaxial or hybrid fiber-coaxial (HFC) network provides a point-to-multipoint topology for supporting bidirectional data communication between a cable modem termination system (CMTS) at the cable headend and multiple cable modems at the customer premises. The communication path from the CMTS to the cable modems is typically referred to as the downstream, while the communication path from the cable modems to the CMTS is typically referred to as the upstream.

DOCSIS (Data Over Cable Service Interface Specification) refers to a group of specifications published by CableLabs that define industry standards for cable headend and cable modem equipment. In part, DOCSIS sets forth requirements and objectives for various aspects of cable modem systems including operations support systems, management, data interfaces, as well as network layer, data link layer, and physical layer transport for data over cable systems. The current version of the DOCSIS specification is version 2.0, and includes the DOCSIS Radio Frequency Interface (RFI) Specification SP-RFIv2.0-I03-021218 (hereinafter, "the DOCSIS RFI Specification"), the entirety of which is incorporated by reference herein.

One difference between DOCSIS 2.0 and earlier versions of the standard is that two different burst type formats are supported for upstream physical (PHY) layer transmissions between cable modems and the CMTS. In particular, as specified by the DOCSIS RFI Specification, the upstream physical media dependent (PMD) sublayer can use either an FDMA/TDMA burst type format, also referred to as the "TDMA mode," or an FDMA/TDMA/S-CDMA burst type format, also referred to as the "S-CDMA mode." Whether the TDMA mode or S-CDMA mode is used by a cable modem is configured by the CMTS through the transmission of DOCSIS MAC (media access control) messages.

FDMA (frequency division multiple access) indicates that multiple RF channels are assigned in the upstream band. A cable modem transmits on a single RF channel unless reconfigured to change channels. TDMA (time division multiple access) indicates that upstream transmissions have a burst nature. A given RF channel is shared by multiple cable modems via the dynamic assignment of time slots. S-CDMA (synchronous code division multiple access) indicates that multiple cable modems can transmit simultaneously on the same RF channel and during the same TDMA time slot, while being separated by different orthogonal codes.

In accordance with the DOCSIS RFI Specification, the upstream modulator of a DOCSIS cable modem can utilize Trellis Coded Modulation (TCM) for modulating upstream bursts in S-CDMA mode only. As will be appreciated by persons skilled in the relevant art(s), TCM refers to a modulation technique that incorporates redundancy into a modulation constellation to attain coding gain. In TCM, a symbol transition rule is used that maximizes the Euclidean distance between successive transmissions in the modulation signal space.

According to the DOCSIS RFI Specification, TCM cannot be used for upstream communication in the TDMA mode. However, it has been observed that the use of TCM in the TDMA mode would also provide significant benefits in terms of coding gain, particularly when combined with forward error correction (FEC) techniques such as Reed Solomon error correction and byte interleaving.

What is desired then, is a cable modem method and apparatus that permits TCM to be used for modulating upstream bursts while operating in the TDMA mode of a DOCSIS 2.0 system. The desired method and apparatus should permit a cable modem to optionally enable or disable TCM while operating in the TDMA mode, thereby permitting the cable modem to inter-operate with enhanced headend equipment that is designed to process TCM modulated signals in the TDMA mode as well as with conventional DOCSIS-compliant headend equipment that is not designed to process such signals.

BRIEF SUMMARY OF THE INVENTION

The present invention is directed to a method and apparatus for performing trellis coded modulation of signals for transmission on a TDMA channel of a cable network, such as a DOCSIS cable network. A cable modem in accordance with an embodiment of the present invention includes a coding module and a modulator. The coding module receives burst data, determines if the burst data should be trellis coded modulated, and encodes the burst data for trellis coded modulation when appropriate to generate encoded symbols. The modulator then modulates the encoded symbols for selective transmission over a time division multiple access (TDMA) channel or a synchronous code division multiple access (S-CDMA) channel of the cable network.

In an embodiment, the coding module comprises a bytes to symbol mapper that performs bytes to symbol mapping of the burst data to generate sets of input bits, and a convolutional encoder that convolutionally encodes a portion of each set of input bits. For example, in an embodiment, the bytes to symbol mapper selectively maps bytes of the burst data to one or two predetermined positions in a plurality of the sets of input bits, and the convolutional encoder convolutionally encodes two input bits from each set of input bits.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

A. Example Operating Environment

An embodiment of the present invention may be advantageously implemented in an upstream modulator portion of a cable modem, wherein the upstream modulator comprises a portion of the cable modem that interfaces with the cable network. The upstream modulator preferably includes both a digital signal processing portion and an electrical-level modulation portion, wherein the digital signal processing portion performs forward error correction (FEC), preamble prepend, symbol mapping, and other processing steps.

Figure 1:
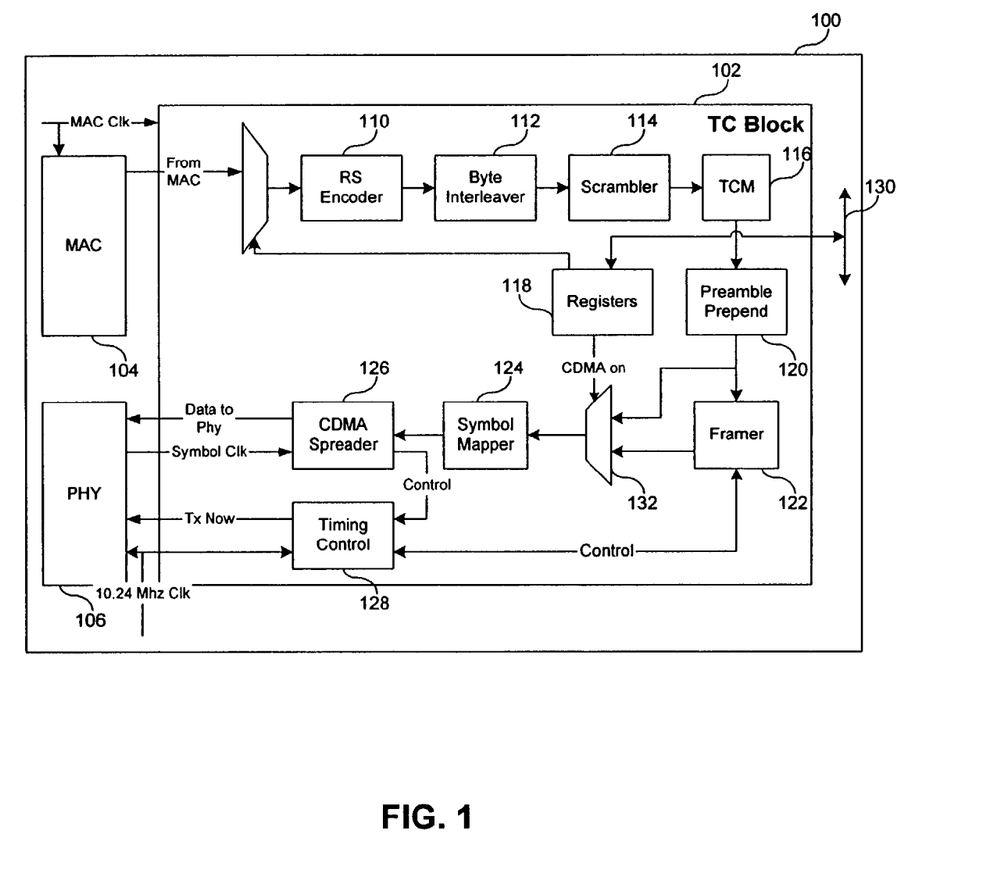
FIG. 1 is a block diagram that depicts a transmission convergence (TC) block of a cable modem that implements an embodiment of the present invention

FIG. 1 is a block diagram that depicts a transmission convergence (TC) block 102 of a cable modem 100 that implements an embodiment of the present invention. As shown in FIG. 1, TC block 102 resides between a media access control (MAC) layer 104 and a physical (PHY) layer 106 of cable modem 100. In an alternate embodiment, TC block 102 comprises a portion of PHY layer 106. TC block 102 performs digital signal processing tasks to prepare burst data received from MAC layer 104 for upstream transmission by PHY layer 106, and also timing control for upstream transmissions. As used herein, the term "burst" encompasses a physical RF entity that includes a single preamble plus data, and, in the absence of preceding and following bursts, exhibits RF energy ramp-up and ramp-down.

In accordance with an embodiment of the present invention, TC block 102 is implemented entirely in hardware using conventional circuit logic design techniques. For example, TC block 102 may comprise an integrated circuit chip or, alternatively, a portion of a larger integrated circuit chip that also includes cable modem MAC layer 104 and/or PHY layer 106. Alternately, TC block 102, or portions thereof, may be implemented in software and executed by a processor which is either internal or external with respect to cable modem 100.

As will be described in more detail herein, TC block 102 is adapted to perform upstream transmission processing in either a TDMA mode or in an S-CDMA mode as required by the DOCSIS RFI Specification (DOCSIS Radio Frequency Interface Specification SP-RFIv2.0-I03-021218), which is incorporated in its entirety by reference herein. In particular, Section 6.2.2 and FIGS. 6-2 and 6-3 of the DOCSIS RFI Specification set forth the mandatory signal processing order for both the TDMA mode and the S-CDMA mode for DOCSIS-compliant cable modems. However, in addition to implementing these standard processing sequences, TC block 102 is also adapted to perform an extended TDMA processing sequence, not provided for by DOCSIS 2.0, that incorporates Trellis Code Modulation (TCM).

As shown in FIG. 1, TC block 102 includes a Reed Solomon (RS) encoder 110, a byte interleaver 112, a scrambler 114, a TCM module 116, a preamble prepend module 120, a framer 122, a symbol mapper 124, a CDMA spreader 126, and a timing control module 128. TC block 102 also includes a set of registers 118, or other suitable memory device, that stores profile information pertaining to how each burst received by TC block 102 should be processed by one or more of the aforementioned components. For example, such profile information may specify the following channel or burst-specific attributes: S-CDMA or TDMA mode, modulation type, whether TCM encoding is on or off, whether RS FEC is on or off (and the number of RS codeword parity and information bytes), whether scrambling is on or off, scrambler seed value, whether S-CDMA spreading is on or off, and the like. Registers 118 are loaded by a cable modem entity external to TC block 102 by way of a bus 130.

The upstream signal processing flow begins with the receipt of burst data from cable modem MAC 104. Burst data is typically received as a stream of data packets, which are then separated into distinct information blocks for processing by RS encoder 110. RS encoder 110 performs RS encoding of the burst data. In both TDMA mode and S-CDMA mode, RS encoder 110 may be turned on or off on a burst by burst basis. When RS encoder 110 is disabled, burst data is passed through RS encoder 110 unmodified.

Byte interleaver 112 operates in conjunction with RS encoder 110 to perform an operation of byte permutation on RS-encoded burst data, thereby increasing the coding gain of the communication channel. Like RS encoding, interleaving can be turned on or off on a burst by burst basis. However, if RS encoder 110 is disabled for a burst, then byte interleaver 112 must also be disabled for that burst since there will not be any RS codewords to be interleaved. In a non-interleaved mode, burst data is passed through byte interleaver 112 unchanged.

Scrambler 114 receives burst data from byte interleaver 112 and randomizes it in order to provide an even distribution of symbols in the constellations generated by TC block 102. In an embodiment, the generator polynomial and initial seed value are programmable to 23 bits. Burst data is then passed from scrambler 114 to TCM module 116.

TCM module 116, which will be described in more detail below, performs TCM bytes to symbol mapping and TCM encoding of the burst data. According to the DOCSIS RFI Specification, these functions may only be performed in S-CDMA mode. However, in accordance with an embodiment of the present invention, these functions may be turned on or off in both the S-CDMA mode and in the TDMA mode. In either case, if TCM is turned off, then TCM module 116 generates symbols using a simple byte to symbol mapping technique typically associated with TDMA channels, which will also be described in more detail herein.

After TCM module 116 converts the burst data into symbols, it passes the burst data to preamble prepend module 120, which adds preamble symbols to the front of the data stream. As will be appreciated by persons skilled in the relevant art(s), the preamble data comprises a training sequence that is used by the CMTS demodulator for synchronizing to a transmitted burst. In an embodiment, the burst preamble data is stored in registers 118 and accessed as needed by preamble prepend module 120.

In the S-CDMA mode, preamble prepend module 120 outputs burst data to framer 122, which performs the ordering of data for the CDMA spreader as well the interleaving the data into mini-slots for the CDMA mode. In the TDMA mode, preamble prepend module 120 outputs burst data directly to symbol mapper 124. Consequently, symbol mapper 124 may receive its input from either preamble prepend module 120 or from framer 122 depending on whether the burst is being processed in TDMA mode or S-CDMA mode, as indicated by a multiplexer 132 in FIG. 1.

Symbol mapper 124 maps symbols received from either preamble prepend module 120 or framer 122 to a corresponding I/Q constellation point based on a current channel/burst profile configuration. In accordance with an embodiment of the invention, supported modulation modes in both the S-CDMA and TDMA mode include, but are not limited to, TCM-encoded QPSK, 8QAM, 16QAM, 32QAM, 64QAM, 128QAM, and 256QAM.

The output of symbol mapper 124 is provided to CDMA spreader 126. In TDMA mode, CDMA spreader 126 provides the symbols directly to PHY layer 106, which comprises a pre-equalizer that pre-equalizes the symbol stream, a filter that filters the stream for spectral shaping, and a modulator that performs modulation at precise times to output RF waveform bursts onto an upstream channel of the cable network. In S-CDMA mode, CDMA spreader 126 spreads the symbols in accordance with a set of orthogonal spreading codes before providing them to PHY layer 106, which then pre-equalizes the signal stream, filters the signal for spectral shaping, and then performs modulation at precise times to output RF waveform bursts onto an upstream channel of the cable network. In either case, transmission timing control is provided by timing control module 128.

Figure 2:
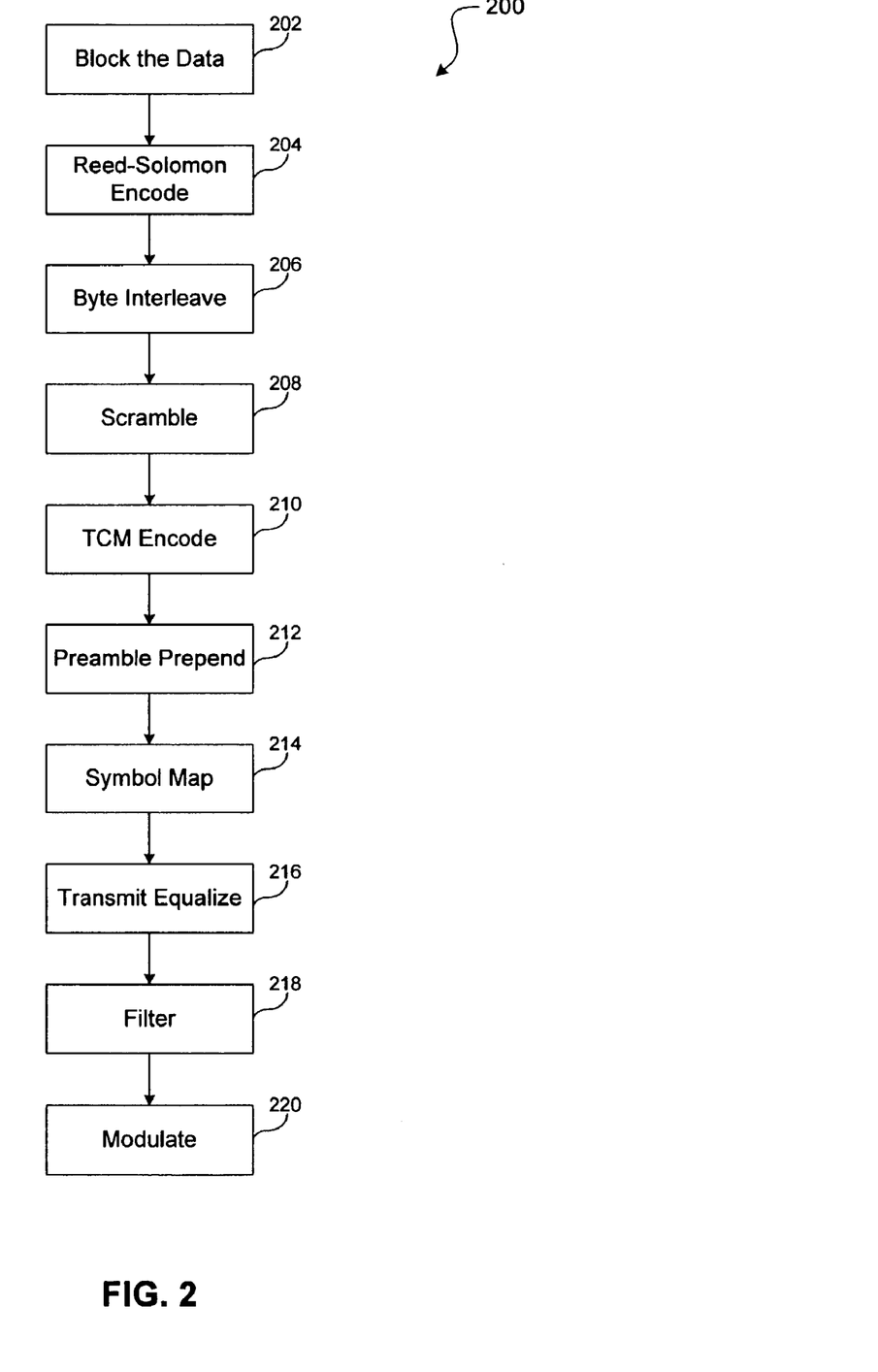
FIG. 2 depicts an exemplary TDMA transmission processing flow for an upstream modulator of a cable modem in accordance with an embodiment of the present invention.

FIG. 2 depicts an exemplary transmission processing flow 200 for an upstream modulator of a cable modem operating in a TDMA mode in accordance with an embodiment of the present invention. Transmission processing flow 200 can be implemented by cable modem 100 described immediately above in reference to FIG. 1. As shown in FIG. 2, exemplary transmission processing flow 200 advantageously permits TCM modulation to be used in a TDMA processing mode, contrary to the DOCSIS RFI specification. This feature can be useful when the cable modem is communicating with enhanced headend equipment, such as an enhanced CMTS, that is adapted to receive TCM signals over a DOCSIS TDMA channel.

In particular, processing flow 200 begins at step 202, in which a packet stream input is received from the cable modem MAC and is separated into information blocks. At steps 204 and 206, the information blocks are optionally RS encoded and interleaved. At step 208, the burst data is scrambled. At step 210, the burst data is optionally TCM encoded. At step 212, preamble symbols are prepended to the burst data. At step 214, the data stream is mapped into modulator symbols. At step 216, the symbol stream is pre-equalized for transmission and at step 218, the symbol stream is filtered for spectral shaping. Finally, at step 220, modulation at precise times occurs to produce output RF waveform bursts for transmission over a TDMA channel of the cable network.

B. TCM Encoding in Accordance with Embodiments of the Present Invention

Figure 3:
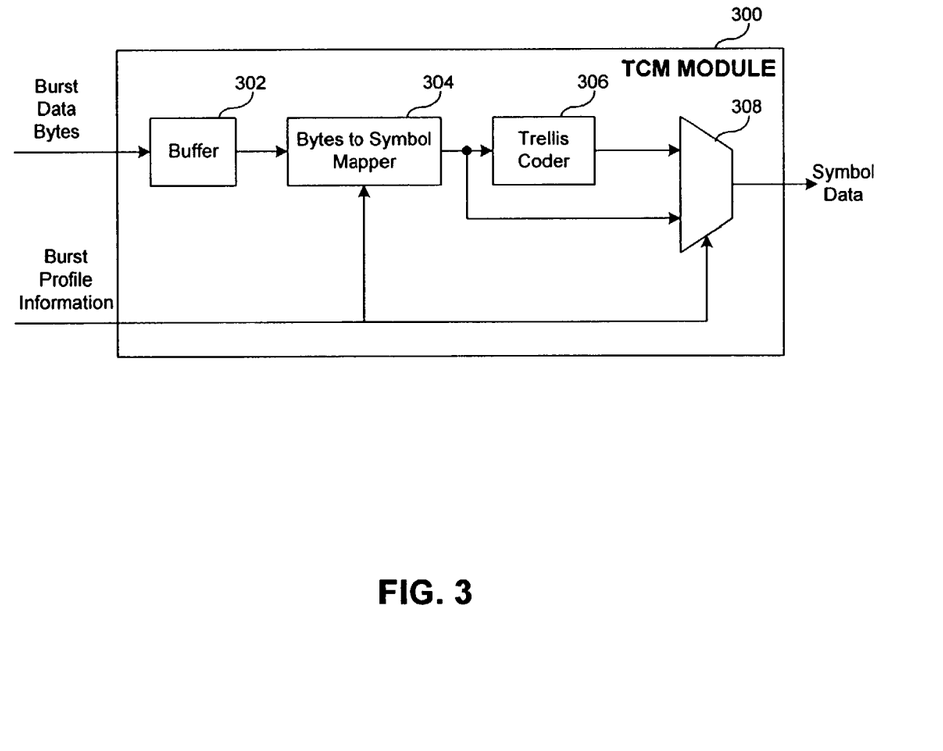
FIG. 3 depicts a TCM module that operates in both a TDMA mode and an S-CDMA mode to selectively encode burst data for TCM transmission over a cable network in accordance with an embodiment of the present invention.

FIG. 3 depicts an exemplary TCM module 300 in accordance with an embodiment of the present invention. TCM module 300 operates in both a TDMA mode and an S-CDMA mode to selectively encode burst data for TCM transmission over a cable network. Whether TCM module 300 encodes burst data for TCM transmission depends on whether TCM is turned on or off for a particular burst.

As shown in FIG. 3, TCM module comprises a buffer 302, a bytes to symbol mapper 304, and a trellis coder 306. Buffer 302 operates to store one or more burst data bytes received from an earlier stage in the upstream transmission processing flow, such as from scrambler 114 described above in reference to FIG. 1. Bytes to symbol mapper 304 retrieves bytes stored in buffer 302 and then performs a bytes to symbol mapping function on them.

When TCM is turned on, bytes to symbol mapper 304 performs a TCM bytes to symbol mapping function that ensures that burst data bytes will either be processed in their entirety by a convolutional encoder portion of trellis coder 306 (which will be described below), or not processed by the convolutional encoder at all. This mapping ensures that the benefits of TCM will accrue to entire bytes, as opposed to being dispersed across bits of several different bytes, thereby improving coding gain. The benefits of using this mapping will be described in more detail in Section C, below. Bytes to symbol mapper 304 determines whether TCM is turned on or off for a particular burst by accessing related burst profile information, which may be stored, for example, in a set of registers accessible by TCM module 300, such as registers 118 described above in reference to FIG. 1.

In particular, when TCM is on, bytes to symbol mapper 304 maps bytes to symbols, wherein the symbols comprise anywhere from 1 to m trellis coder input bits, $i^1, \ldots, i^m$. The number of input bits is determined by the modulation type specified for the burst. The modulation type specified for the burst is part of the burst profile information that is available to bytes to symbol mapper 304. Thus, bytes to symbol mapper 304 uses this profile information to determine the number of trellis encoder input bits to generate per symbol, as well as the number of bytes to use for generating those bits.

In an embodiment, bytes to symbol mapper 304 generates anywhere from 1 to 7 trellis coder input bits per symbol, wherein 1 input bit corresponds to QPSK (quadrature phase shift key) TCM, 2 input bits corresponds to 8QAM (quadrature amplitude modulation) TCM, 3 input bits corresponds to 16QAM TCM, 4 input bits corresponds to 32QAM TCM, 5 input bits corresponds to 64QAM TCM, 6 input bits corresponds to 128QAM TCM, and 7 input bits corresponds to 256QAM TCM.

Input bits $i^1$ and $i^2$ represent the bits that are input to a convolutional encoder portion of trellis coder 306, while input bits $i^3$ to $i^m$ represent the bits that are left uncoded by trellis coder 306. The mapping is performed such that each byte of burst data is either mapped entirely to the uncoded input bits $i^m, \ldots, i^3$, or entirely to the convolutional encoder input birs $i^2i^1$. The decision is made sequentially for each byte using the rule that the byte assignment should lead to the shortest packet of symbols including tail symbols, if the current byte were the last byte encoded.

Figure 4A:
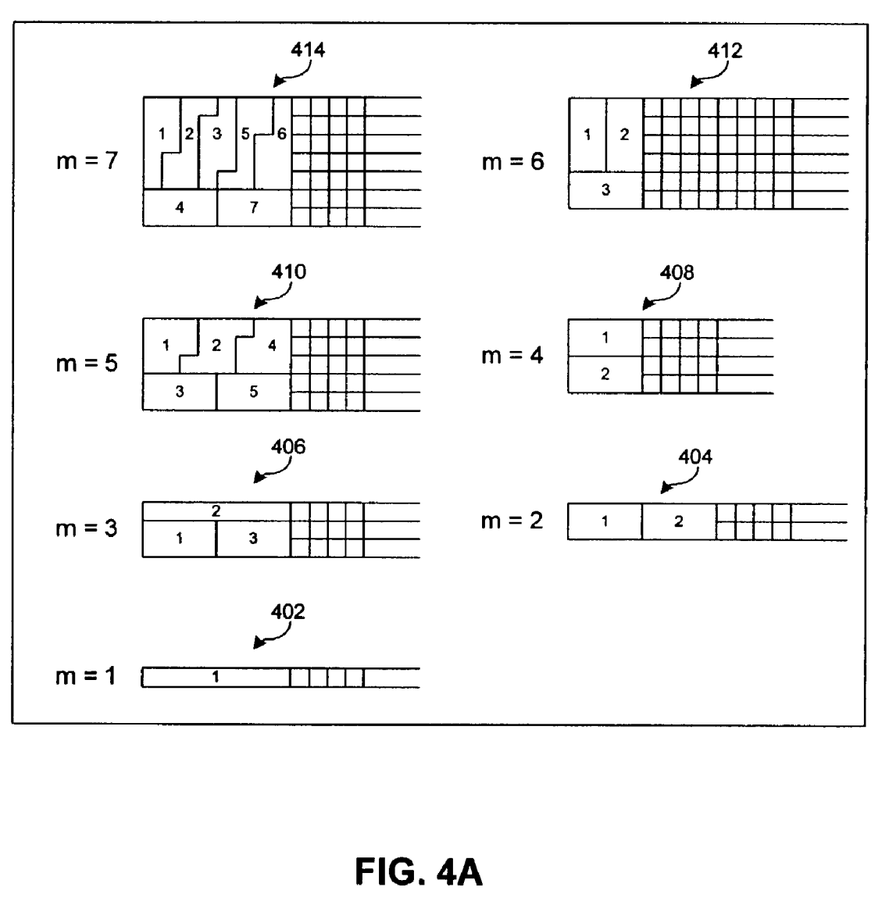
FIG. 4A illustrates a mapping of byte assignments to input bits as performed by a TCM bytes to symbol mapper in accordance with an embodiment of the present invention.

This rule results in the repetitive patterns of byte assignments to input bits depicted in FIG. 4A for m=1 to 7. As shown in FIG. 4A, the bytes assignment to input bits for m=1 is labeled 402, the bytes assignment to input bits for m=2 is labeled 404, the bytes assignment to input bits for m=3 is labeled 406, the bytes assignment to input bits for m=4 is labeled 408, the bytes assignment to input bits for m=5 is labeled 410, the bytes assignment to input bits for m=6 is labeled 412, and the bytes assignment to input bits for m=7 is labeled 414. For each mapping, bit $i^m$ is at the top and bit $i^1$ is at the bottom of each set of input bits.

For example, when m=3, bytes to symbol mapper 304 maps three bytes in the repetitive pattern labeled 406 in FIG. 4A. As shown, the first byte (byte 1) is mapped to input bits $i^1$ and $i^2$ for the first four sets of input bits, the second byte (byte 2) is mapped to input bit $i^3$ for all eight sets of input bits, and the third byte (byte 3) is mapped to input bits $i^1$ and $i^2$ for the last four sets of input bits.

Figure 4B:
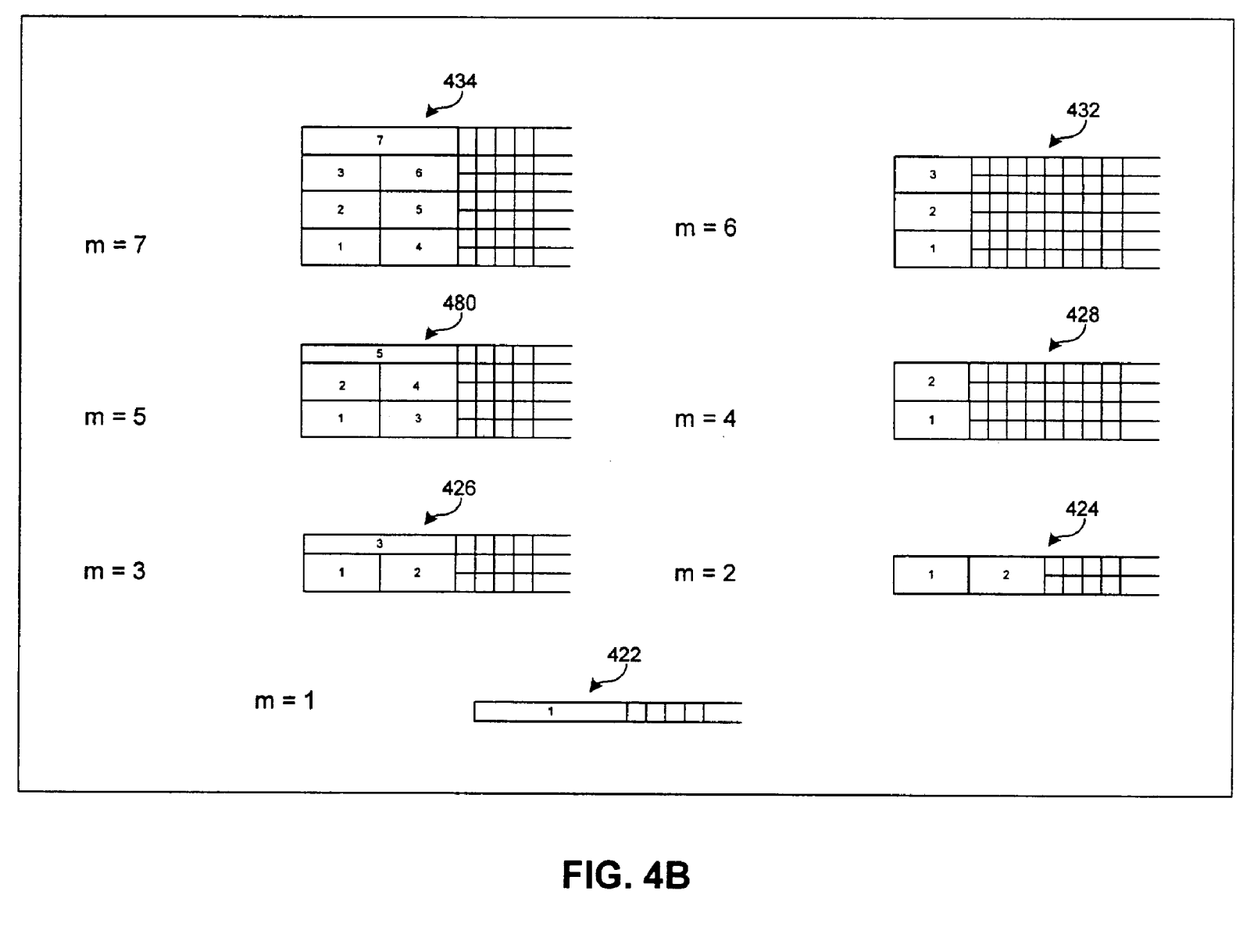
FIG. 4B illustrates an alternate mapping of byte assignments to input bits as performed by a TCM bytes to symbol mapper in accordance with an embodiment of the present invention.

FIG. 4B depicts an alternate mapping of byte assignments to input bits as performed by a TCM bytes to symbol mapper in accordance with an embodiment of the present invention. As shown in FIG. 4A, the bytes assignment to input bits for m=1 is labeled 422, the bytes assignment to input bits for m=2 is labeled 424, the bytes assignment to input bits for m=3 is labeled 426, the bytes assignment to input bits for m=4 is labeled 428, the bytes assignment to input bits for m=5 is labeled 430, the bytes assignment to input bits for m=6 is labeled 432, and the bytes assignment to input bits for m=7 is labeled 434.

The bytes to symbol mapping scheme of FIG. 4B achieves the same goal of that present in FIG. 4A—namely, ensuring that the TCM encoding is applied to entire bytes. However, the difference between the mappings of FIG. 4B and those illustrated in FIG. 4A is that the scheme depicted in FIG. 4A is intended to minimize the overhead added by the TCM encoding, while the scheme depicted in FIG. 4B is intended to maximize the number of bytes covered by TCM encoding. Consequently, the mappings of FIG. 4B would be better suited for noisy channels, at the expense of additional overhead.

Figure 5:
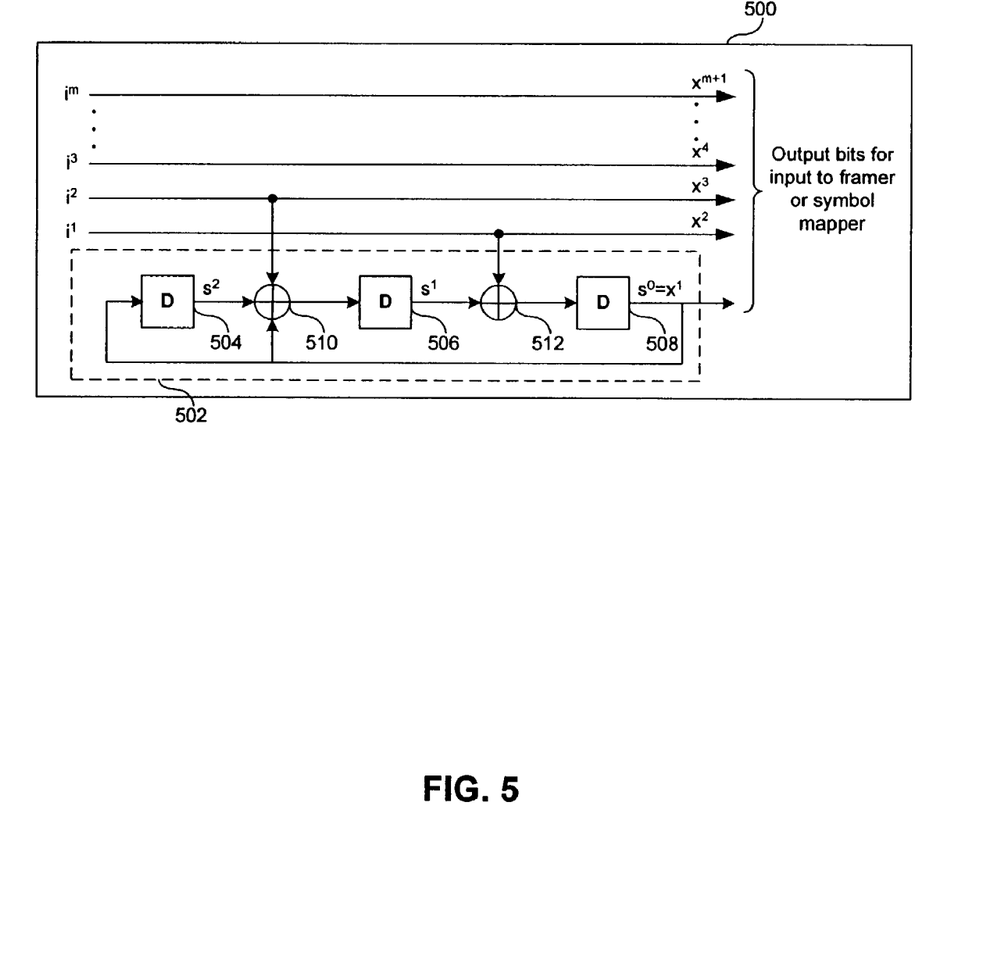
FIG. 5 depicts a trellis coder in accordance with an embodiment of the present invention.

When TCM is on, the m input bits generated by bytes to symbol mapper, $i^1, \ldots i^m$, are input to trellis coder 306. FIG. 5 depicts an exemplary trellis coder 500 in accordance with an embodiment of the present invention. Trellis coder 500 comprises an 8-state encoder that performs a mapping of the m input bits into m+1 output bits for input into either a framer in S-CDMA mode, such as framer 122 described above in reference to FIG. 1, or to a symbol mapper in TDMA mode, such as symbol mapper 124 described above in reference to FIG. 1. As shown in FIG. 5, trellis coder 500 directly maps input bits $i^1, \ldots i^m$ to uncoded output bits $x^2, \ldots x^{m+1}$, respectively.

Trellis coder 500 also includes a convolutional encoder portion 502 that comprises a series of delay registers 504, 506, and 508 and adders 510 and 512. Convolutional encoder portion 502 uses input bits $i^1$ and $i^2$ to generate the additional coded output bit $x^1$. In an embodiment in which the input bits are provided to trellis coder 500 as a serial stream, the most significant bit (MSB) $i^m$ is the first bit in the serial data fed into the uncoded input bits (i.e., $i^m$ to $i^3$) of trellis coder 500, while the MSB $i^2$ is the first bit in the serial data fed into the convolutional encoder portion 502 of trellis coder 500.

Trellis coder 500 is configured so that the initial state of the convolutional encoder portion 502 is the zero state. In other words, trellis coder 500 is configured so that the zero state is reached again with the last encoded symbol. To return to the zero state from all possible Trellis paths when m=1 (QPSK TCM), trellis coder 500 generates three tails symbols with input bit $i^1$ set to $i^1=s^1$. After three symbols, the state bits $s^2$, $s^1$, and $s^0=x^1$ will be zero. Tail symbols are extra symbols, which carry no information.

To return to zero state from all possible Trellis paths when m=2, trellis coder 500 generates two tail symbols in which the input bits $i^2i^1$ are set such that the zero state is reached. In particular, the first symbol is set to $i^2=0$, $i^1=s^1$, and the second (final) symbol to $i^2=s^2$, $i^1=s^1$. After these two symbols the state bits $s^2$, $s^1$ and $s^0=x^1$ will be zero.

If m≧3, trellis coder 500 uses the uncoded bits $i^m, \ldots i^3$ for information encoding whenever possible. Otherwise, trellis coder 500 sets the uncoded bits to zero. In this instance, the number of tails symbols carrying no information will depend on the ending conditions and can vary between zero and two.

When TCM is turned off, bytes to symbol mapper 304 performs a simple bytes to symbol mapping function typically associated with TDMA processing. This "classic" TDMA mapping consists of taking the MSB of each byte and using that as the first bit in a serial data stream. The serial data stream is fed into the symbol mapper where, based upon the software-selected encoding, a set number of bits are used for each symbol. The MSB of the byte becomes the MSB of the symbol with the remainder from that byte becoming the next symbol until all bytes are encoded. Since the number of data bytes may not map into an integer multiple of symbols, there may be empty symbol slots. These are padded with zeros until the next symbol.

Multiplexer 308 of FIG. 3 demonstrates that the symbol data output from TCM module 300 is either the output of trellis coder 306, when TCM is on, or the output of bytes to symbol mapper 304, when TCM is off. As previously described, whether TCM is turned on or off for a particular burst is determined by accessing related burst profile information available to TCM module 300.

Figure 6:
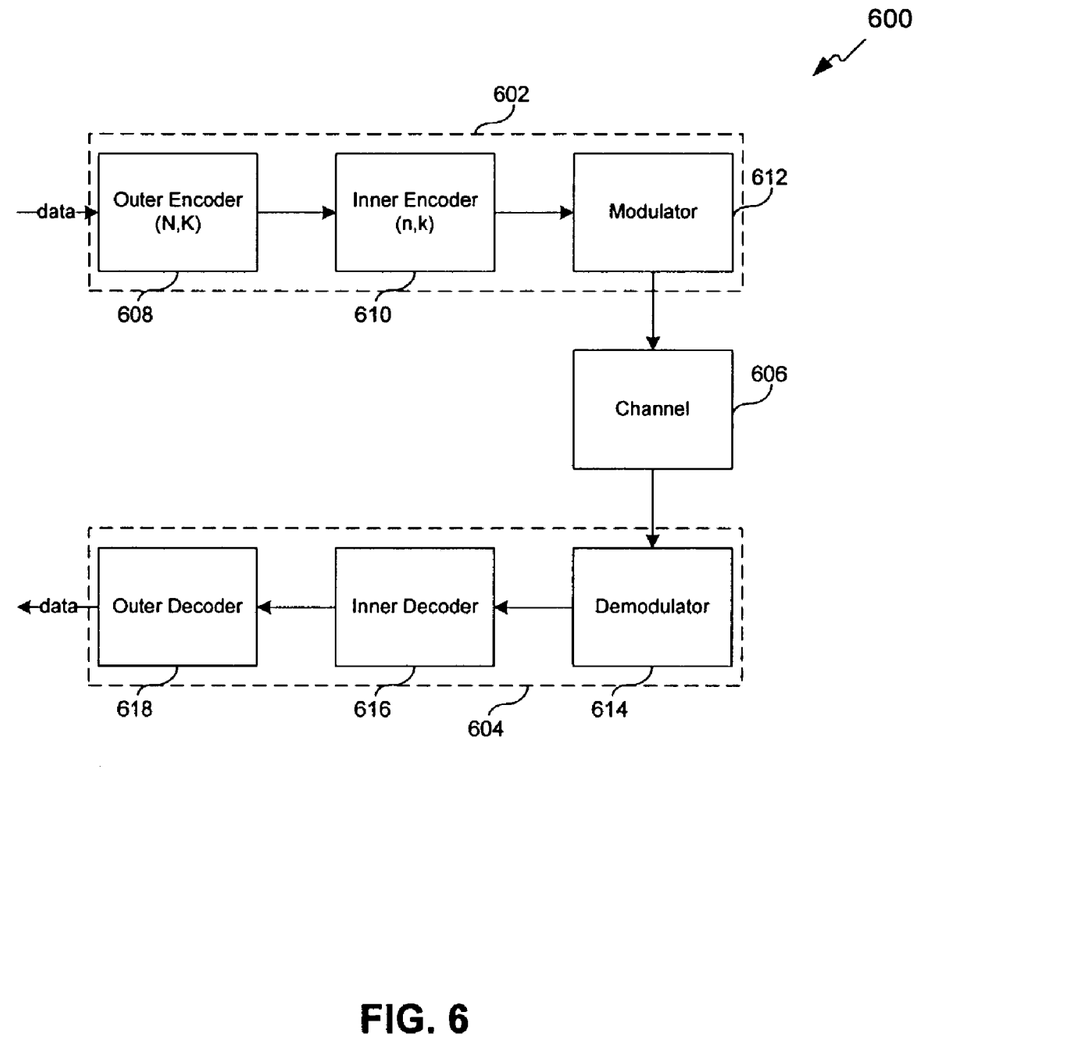
FIG. 6 is a depiction of a TDMA digital communication system that advantageously implements encoding techniques in accordance with embodiments of the present invention.

C. Benefits of TCM Encoding in Accordance with Embodiments of the Present Invention An advantage of using the above-described TCM encoding techniques for communication over a TDMA channel of a communications system, such as a cable network, will now be described. FIG. 6 depicts a general TDMA digital communication system 600, which will be described herein for illustrative purposes. As shown in FIG. 6, TDMA digital communication system 600 comprises a transmitting device 602 and a receiving device 604, which are communicatively coupled via a channel 606 of communications system 600.

Transmitting device 602 comprises an outer encoder 608, an inner encoder 610 and a modulator 612. Receiving device 604 comprises a demodulator 614, an inner decoder 616, and an outer decoder 618. In accordance with an embodiment of the present invention, channel 606 comprises a TDMA channel. In other words, channel 606 comprises a channel in which transmissions have a burst nature, and in which a given channel is shared by multiple transmitting devices.

Outer encoder 608 receives burst data and encodes it for error detection and correction purposes. In accordance with an embodiment of the present invention, outer encoder 608 comprises a block encoder, such as a Reed Solomon encoder, that operates on data in discrete information blocks, wherein the block size is typically one or more bytes of data. In accordance with this embodiment, outer encoder 608 generates codewords having a size of N blocks, wherein K of the N blocks represent the original (or payload) data, and N−K blocks represent added parity (or overhead) data.

Because outer encoder 608 comprises a block encoder, outer decoder 618 can only correct a limited number of blocks per codeword. For example, where outer encoder 608 comprises a Reed Solomon encoder, outer decoder 618 can only correct a number of blocks equal to one half of the number of blocks that were added as overhead by outer encoder 608. In a case in which the number of blocks with errors exceeds this number, the outer encoding scheme will fail. For example, where the codeword size N=10 blocks, and the payload size K=8 blocks, outer decoder 608 can only correct one block of the entire 10 block codeword. If two or more codeword blocks are transmitted with errors, the encoding scheme will fail.

In accordance with an embodiment of the present invention, inner encoder 610, which may comprise a TCM encoder, operates to encode only a portion of the burst data processed by outer encoder 608. There are many reasons why inner encoder 610 may be limited to encoding only a portion of the burst data. For example, such reasons may include but are not limited to increasing the speed of, or decreasing the size and/or complexity of, transmitting device 602 and receiving device 604.

Figure 7:
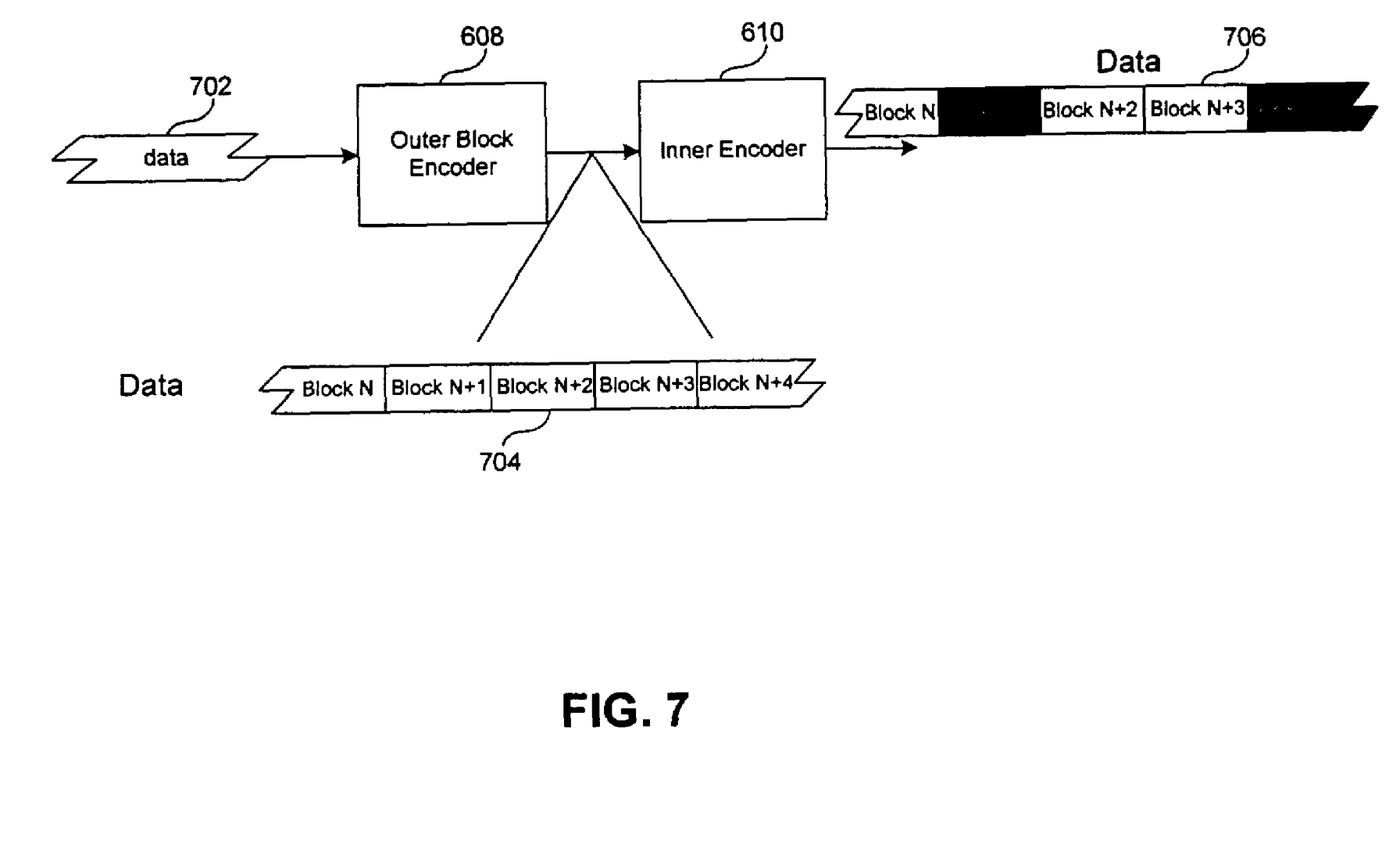
FIG. 7 illustrates the outer encoding and inner encoding of burst data by an outer encoder and inner encoder, respectively, in accordance with an embodiment of the present invention.

An embodiment of the present invention operates to ensure that the portion of the data that is encoded by inner encoder 610 covers continuous and complete outer encoder blocks. This concept is illustrated in FIG. 7, in which continuous burst data 702 is received by outer encoder 608, which comprises a block encoder. Outer encoder 608 divides the data into a predefined block size. In an embodiment, a byte interleaver also operates to rearrange the blocks. As shown in FIG. 7, the output of outer encoder 608 comprises a series of blocks 704 including blocks N, N+1, N+2, N+3, and N+4. These blocks are received by inner encoder 610, which operates to inner encode only a part of the data. The output of inner encoder 610 is shown is shown as a series of blocks 706 including blocks N, N+1, N+2, N+3, and N+4, in which only blocks N+1 and N+4 are inner encoded.

Figure 8:
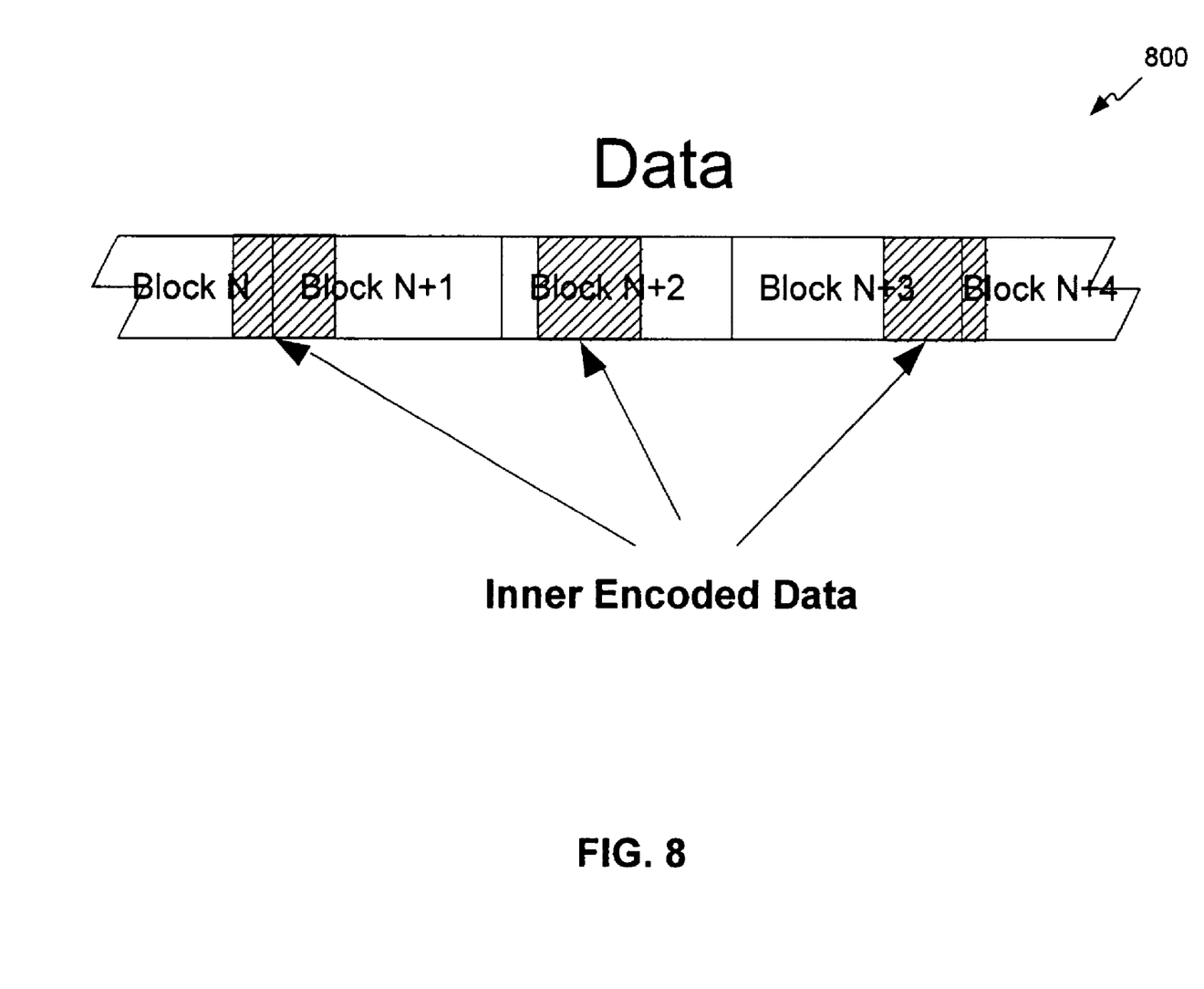
FIG. 8 illustrates encoded burst data in which inner coded data is not aligned with outer coded data.

An embodiment of the present invention ensures that inner encoder 610 encodes blocks in alignment with the outer encoder block size, as opposed to the arrangement of encoded data 800 depicted in FIG. 8, which would be the result if there was no correlation between the inner and outer encoder. For example, in the embodiment of the present invention described in Sections A and B, above, the outer encoder is a Reed Solomon encoder with a block size of one byte and the inner encoder is a TCM encoder. A TCM bytes to symbol mapping technique is used to ensure that the TCM encoder will encode 1-byte blocks in a manner that causes them to be aligned with the encoding of the Reed Solomon encoder.

An advantage provided by an embodiment of the present invention is that inner decoder 616 will correct complete blocks. As discussed above, outer decoder 618, which comprises a block decoder, can only correct a limited number of codeword blocks, so in any case where the number of codeword blocks with errors is greater than this number, outer decoder 618 will fail. An embodiment of the present invention reduces the probability of failure of outer decoder 618, because the inner coding reduces the probability of a codeword block having an error.

This concept may be further illustrated with further reference to FIGS. 7 and 8. For the purpose of this example, assume that: (a) inner decoder 616 can correct all errors in blocks that are covered by the inner coding; (b) one codeword for the outer code consists of blocks N+1, N+2, and N+3; (c) the outer code can correct 1 out of every 3 blocks (i.e., the codeword payload is one block and the overhead is two blocks); and (d) an error occurs in the data between block N and block N+1.

Based on these assumptions, the encoding scheme depicted in FIG. 7 would results in all the data in block N+1 being corrected by inner decoder 616. Consequently, outer decoder 618 would be capable of correcting block N, the only remaining block with errors. In contrast, using the encoded data 800 depicted in FIG. 8, inner decoder 616 would correct part of block N+1, but there would still be uncorrected errors. As a result, when the data arrives at outer decoder 618, there are still 2 out of 3 codeword blocks with errors, and outer decoder 618 cannot correct them.

D. Processor-Based Implementations

Figure 9:
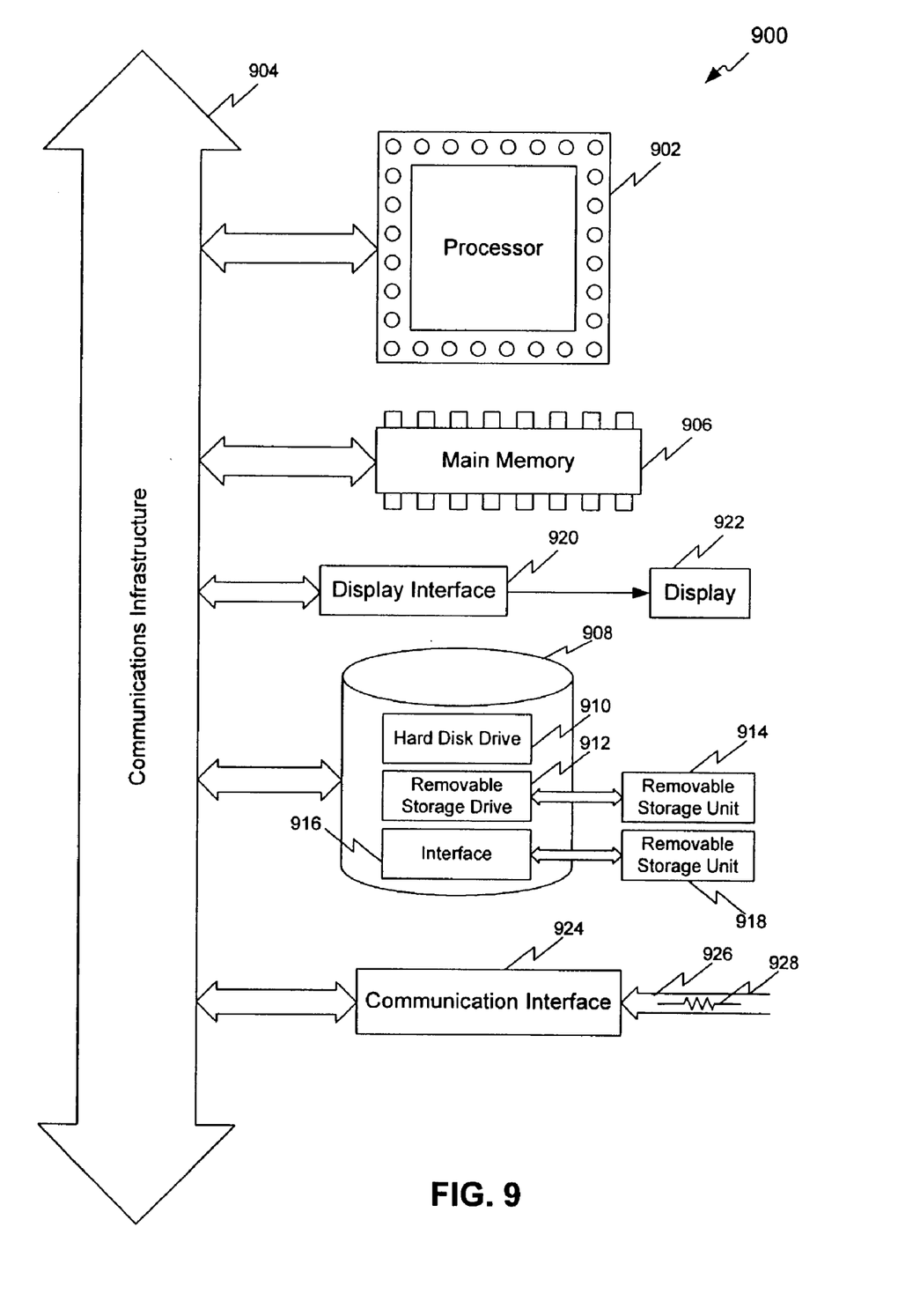
FIG. 9 depicts an example computer system that may execute software for implementing the features of the present invention.

As discussed elsewhere herein, the features of the present invention may be implemented in software and executed by one or more processor-based computer systems. FIG. 9 depicts an example computer system 900 that may execute software for implementing the features of the present invention, including, but not limited to, any of the features of cable modem 100 and TC block 102 described above in reference to FIG. 1, any of the method steps of flowchart 200 described above in reference to FIG. 2, any of the features of TCM module 300 described above in reference to FIG. 3, or any of the features of trellis coder 500 described above in reference to FIG. 5.

As shown in FIG. 9, example computer system 900 includes a processor 902 for executing software routines in accordance with embodiments of the present invention. Although a single processor is shown for the sake of clarity, computer system 900 may also comprise a multi-processor system. Processor 902 is connected to a communications infrastructure 904 for communication with other components of computer system 900. Communications infrastructure 904 may comprise, for example, a communications bus, cross-bar, or network.

Computer system 900 further includes a main memory 906, such as a random access memory (RAM), and a secondary memory 908. Secondary memory 908 may include, for example, a hard disk drive 910 and/or a removable storage drive 912, which may comprise a floppy disk drive, a magnetic tape drive, an optical disk drive, flash memory, or the like. Removable storage drive 912 reads from and/or writes to a removable storage unit 914 in a well known manner. Removable storage unit 914 may comprise a floppy disk, magnetic tape, optical disk, or the like, which is read by and written to by removable storage drive 912. As will be appreciated by persons skilled in the relevant art(s), removable storage unit 914 includes a computer usable storage medium having stored therein computer software and/or data.

In alternative embodiments, secondary memory 908 may include other similar means for allowing computer programs or other instructions to be loaded into computer system 900.

Such means can include, for example, a removable storage unit 918 and an interface 916. Examples of a removable storage unit 918 and interface 916 include a program cartridge and cartridge interface (such as that found in video game console devices), a removable memory chip (such as an EPROM, or PROM) and associated socket, and other removable storage units 918 and interfaces 916 that allow software and data to be transferred from removable storage unit 918 to computer system 900.

Computer system 900 further includes a display interface 920 that forwards graphics, text, and other data from communications infrastructure 904 or from a frame buffer (not shown) for display to a user on a display unit 922.

Computer system 900 also includes a communication interface 924. Communication interface 924 allows software and data to be transferred between computer system 900 and external devices via a communication path 926. Examples of communication interface 924 include a modem, a network interface (such as Ethernet card or 802.11b interface), a communication port, and the like. Software and data transferred via communication interface 924 are in the form of signals 928 which can be electronic, electromagnetic, optical or other signals capable of being received by communication interface 924. These signals 928 are provided to communication interface 924 via communication path 926.

As used herein, the term "computer program product" may refer, in part, to removable storage unit 914, removable storage unit 918, a hard disk installed in hard disk drive 910, or a carrier wave carrying software over communication path 926 (wireless link or cable) to communication interface 924. A computer useable medium can include magnetic media, optical media, or other recordable media, or media that transmits a carrier wave or other signal. These computer program products are means for providing software to computer system 900.

Computer programs (also called computer control logic) are stored in main memory 906 and/or secondary memory 908. Computer programs can also be received via communication interface 924. Such computer programs, when executed, enable computer system 900 to perform the features of the present invention as discussed herein. In particular, the computer programs, when executed, enable processor 902 to perform the features of the present invention. Accordingly, such computer programs represent controllers of the computer system 900.

The features of the present invention can be implemented as control logic in software, firmware, hardware or any combination thereof. In an embodiment where features of the present invention are implemented using software, the software may be stored in a computer program product and loaded into computer system 900 using removable storage drive 912, hard disk drive 910 or communication interface 924. Alternatively, the computer program product may be downloaded to computer system 900 over communication path 926. The software, when executed by processor 902, causes processor 902 to perform features of the invention as described herein.

In another embodiment, features of the present invention are implemented in firmware and/or hardware using, for example, hardware components such as application specific integrated circuits (ASICs). Implementation of a hardware state machine so as to perform the functions described herein will be apparent to persons skilled in the relevant art(s) from the teachings herein.

E. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. For example, the present invention is not limited to cable modem systems and equipment as described herein, but is equally applicable to any broadband communications system that use the DOCSIS media access protocol or any of its derivatives, including but not limited to broadband terrestrial fixed wireless systems, two-way satellite communication systems, and DSL (Digital Subscriber Line) networks. Accordingly, the breadth and scope of the present invention should not be limited by any of the above-described exemplary embodiments, but should be defined only in accordance with the following claims and their equivalents.

What is claimed is:

1. A method for performing trellis coded modulation of signals for transmission over a cable network, comprising:
   receiving a plurality of blocks of outer encoded data by an inner encoder, wherein said outer encoded data includes complete blocks of outer encoded data and incomplete blocks of outer encoded data;
   trellis encoding said complete blocks of outer encoded data to generate a plurality of blocks of trellis encoded data;
   combining said plurality of blocks of trellis encoded data with said incomplete blocks of outer encoded data to generate an encoded data stream; and
   determining if said encoded data stream should be transmitted over a time division multiple access (TDMA) channel or a synchronous code division multiple access (S-CDMA) channel of said cable network;
   if said encoded data stream should be transmitted over said TDMA channel:
   modulating said encoded data stream for transmission over said TDMA channel of said cable network;
   else modulating said encoded data stream for transmission over said S-CDMA channel of said cable network.

2. The method of claim 1, wherein said step of modulating said encoded data stream for transmission over said TDMA channel of said cable network comprises:
   mapping said encoded data stream to constellation points; and
   modulating said constellation points to generate an output RF waveform burst onto said TDMA channel of said cable network.

3. The method of claim 1, wherein said step of determining if said encoded data stream should be transmitted over a TDMA channel or an S-CDMA channel of said cable modem network comprises:
   accessing profile information pertaining to said outer encoded data.

4. The method of claim 1, further comprising:
   receiving burst data in an outer encoder; and
   encoding said burst data to generate said plurality of blocks of outer encoded data.

5. A method for performing trellis coded modulation of signals for transmission over a DOCSIS cable network, comprising:
   receiving a plurality of blocks of outer encoded data by an inner encoder, wherein said outer encoded data includes complete blocks of outer encoded data and incomplete blocks of outer encoded data;

trellis encoding said complete blocks of outer encoded data to generate a plurality of blocks of trellis encoded data;

combining said plurality of blocks of trellis encoded data with said incomplete blocks of outer encoded data to generate an encoded data stream; and determining if said encoded data stream should be transmitted over a time division multiple access (TDMA) channel or a synchronous code division multiple access (S-CDMA) channel of said DOCSIS cable network;

if said encoded data stream should be transmitted over said TDMA channel:

modulating said encoded data stream for transmission over said TDMA channel of said DOCSIS cable network;

else modulating said encoded data stream for transmission over said S-CDMA channel of said DOCSIS cable network.

6. A cable modem adapted for performing trellis coded modulation of signals for transmission over a cable network, comprising:

an inner coding module adapted to receive a plurality of blocks of outer encoded data, wherein said outer encoded data includes complete blocks of outer encoded data and incomplete blocks of outer encoded data, to trellis encode said complete blocks of outer encoded data to generate a plurality of blocks of trellis encoded data, and to combine said plurality of blocks of trellis encoded data with said incomplete blocks of outer encoded data to generate an encoded data stream, wherein said coding module is configured to operate in both a time division multiple access (TDMA) mode and an synchronous code division multiple access (S-CDMA) mode;

a modulator adapted to modulate said encoded data stream for selective transmission over a time division multiple access (TDMA) channel or a synchronous code division multiple access (S-CDMA) channel of said cable network.

7. The cable modem of claim 6, further comprising:

a symbol mapper adapted to map said encoded data stream to constellation points, wherein said modulator is adapted to modulate said constellation points to generate an output RF waveform burst onto said TDMA channel of said cable network.

8. The cable modem of claim 6, further comprising:

an outer encoder, wherein said outer encoder generates said plurality of blocks of outer encoded data.

9. The cable modem of claim 8, wherein said outer encoder includes a block encoder.

10. The cable modem of claim 9, wherein said block encoder includes a Reed Solomon decoder.

11. The cable modem of claim 6, wherein said plurality of blocks of outer encoded data includes one or more blocks of payload data and one or more blocks of added parity data.

12. A cable modem adapted for performing trellis coded modulation of signals for transmission over a DOCSIS cable network, comprising:

an inner coding module adapted to receive a plurality of blocks of outer encoded data, wherein said outer encoded data includes complete blocks of outer encoded data and incomplete blocks of outer encoded data, to trellis encode said complete blocks of outer encoded data to generate a plurality of blocks of trellis encoded data, and to combine said plurality of blocks of trellis encoded data with said incomplete blocks of outer encoded data to generate an encoded data stream, wherein said coding module is configured to operate in both a time division multiple access (TDMA) mode and an synchronous code division multiple access (S-CDMA) mode;

a modulator adapted to modulate said encoded data stream for selective transmission over a time division multiple access (TDMA) channel or a synchronous code division multiple access (S-CDMA) channel of said DOCSIS cable network.

13. A cable modem adapted for performing trellis coded modulation of signals for transmission over a cable network, comprising:

inner coding means for receiving a plurality of blocks of outer encoded data, wherein said outer encoded data includes complete blocks of outer encoded data and incomplete blocks of outer encoded data, trellis encoding said complete blocks of outer encoded data to generate a plurality of blocks of trellis encoded data, and combining said plurality of blocks of trellis encoded data with said incomplete blocks of outer encoded data to generate an encoded data stream; and modulation means for modulating said encoded symbols for selective transmission over a time division multiple access (TDMA) channel or a synchronous code division multiple access (S-CDMA) channel of said cable network.

14. The cable modem of claim 13, further comprising:

symbol mapping means for mapping said encoded data stream to constellation points, wherein said modulation means is adapted to modulate said constellation points to generate an output RF waveform burst onto said TDMA channel of said cable network.

15. The cable modem of claim 13, further comprising:

outer coding means, wherein said outer coding means generates said plurality of blocks of outer encoded data.

16. The cable modem of claim 15, wherein said outer coding means includes a block coding means.

17. The cable modem of claim 16, wherein said block coding means includes a Reed Solomon decoder.

18. The cable modem of claim 13, wherein said plurality of blocks of outer encoded data includes one or more blocks of payload data and one or more blocks of added parity data.

19. A cable modem adapted for performing trellis coded modulation of signals for transmission over a DOCSIS cable network, comprising:

inner coding means for receiving a plurality of blocks of outer encoded data, wherein said outer encoded data includes complete blocks of outer encoded data and incomplete blocks of outer encoded data, trellis encoding said complete blocks of outer encoded data to generate a plurality of blocks of trellis encoded data, and combining said plurality of blocks of trellis encoded data with said incomplete blocks of outer encoded data to generate an encoded data stream; and modulation means for modulating said encoded symbols for selective transmission over a time division multiple access (TDMA) channel or a synchronous code division multiple access (S-CDMA) channel of said DOCSIS cable network.

* * * * *